United States Patent [19]

Young

[11] 4,014,670
[45] Mar. 29, 1977

[54] HAZARD NEUTRALIZING CONTAINER

[75] Inventor: Arch L. Young, El Segundo, Calif.

[73] Assignee: A & J Manufacturing Co., Los Angeles, Calif.

[22] Filed: Jan. 22, 1976

[21] Appl. No.: 651,656

[52] U.S. Cl. .................................. 55/274; 55/384; 55/387

[51] Int. Cl.² ........................................ B01D 53/04

[58] Field of Search .......... 55/74, 220, 384, 385 A, 55/385 C, 387, 389, 274; 220/9 R, 10; 250/494, 506, 507

[56] References Cited

UNITED STATES PATENTS

| | | | |
|---|---|---|---|
| 1,036,631 | 8/1912 | Jackson | 220/9 R |
| 1,646,702 | 10/1927 | Moyer | 55/384 X |
| 2,548,168 | 4/1951 | Luce | 55/384 X |
| 2,976,950 | 3/1961 | Smith | 55/30 |
| 3,246,758 | 4/1966 | Wagner | 55/387 X |
| 3,320,724 | 5/1967 | Rice | 55/387 X |
| 3,453,807 | 7/1969 | Taylor | 55/387 X |
| 3,609,945 | 10/1971 | Saradzhev | 55/384 X |
| 3,803,813 | 4/1974 | Yuzawa | 55/387 X |

*Primary Examiner*—Frank A. Spear, Jr.
*Assistant Examiner*—Robert H. Spitzer
*Attorney, Agent, or Firm*—Nilsson, Robbins, Dalgarn & Berliner

[57] ABSTRACT

An apparatus is provided for neutralizing the harmful effects of hazardous material stored within a rigid housing which might otherwise escape to the atmosphere. A cavity within the rigid housing receives the hazardous material. The cavity is airtight except for interior and exterior vents at the top of each of two double walled sides. A container holding a filter medium capable of neutralizing the toxic or harmful effects of the hazardous material is mounted within a chamber between each of the two double walled sides. The interior vents are connected into the containers so that any unconfined hazardous material within the housing passes through the interior vents into the filter medium. The exterior vents allow the neutralized material to escape to the atmosphere. Warning devices are inserted into the front of the housing and into the tops of the filter container chambers to provide an external visual indication of the presence of unconfined hazardous material within the housing and within the chambers. The warning devices include chemically treated paper visible through an airtight plastic viewing port. The chemically treated paper changes color when exposed to the particular hazardous material stored within the housing.

9 Claims, 5 Drawing Figures

HAZARD NEUTRALIZING CONTAINER

BACKGROUND OF THE INVENTION

This invention relates to a hazard neutralizing container and, more specifically, to a hazard neutralizing container which incorporates a vent to the atmosphere through a filter medium which neutralizes the hazardous effects of the contained material.

Containers for the storage and shipping of hazardous material typically incorporate some technique whereby the container can be rendered hermetic. This is often accomplished by placing the hazardous material in a removable membrane constructed of an elastomeric substance which is resistant to the contained material. For example, neoprene may be used to contain acids, alkalies, paints or varnishes. The membrane can be sealed by a variety of methods, such as mechanical clamps, fluid tight zippers, or fasteners. The membrane and its associated hazardous material are normally placed in a sturdy container. Thus the hermetic characteristics of the membrane and the physical strength of the container are relied upon to prevent escape of the hazardous material to the atmosphere.

This method is satisfactory only if the membrane retains its hermetic characteristics, or if the vapor pressure within the container does not equal or exceed that of the surrounding atmosphere. However, when these conditions are not met, the hazardous material frequently escapes from the membrane and sometimes into the surrounding atmosphere, thus presenting a potential danger to personnel and property.

When the hazardous material is a gas, a method sometimes utilized consists of storing the gas in a pressurized container which can be packed in a holding carton for shipment. However, the same disadvantages are present as with the removable membrane described above in that if the pressurized container should leak, the gas may escape to the surrounding atmosphere. If the holding carton is completely sealed in order to prevent leakage to the atmosphere, then leakage from the pressurized container will cause a pressure buildup in the holding carton which could ultimately erupt with explosive force.

This invention solves the problems outlined above by providing a container which can be used to ship and store hazardous material while at the same time eliminating the hermetic requirements of the hazardous material container through provision of a means by which the harmful effects of the hazardous material are neutralized prior to its reaching the atmosphere. The invention also eliminates significant pressure differentials between the holding carton and the atmosphere, thus preventing the possibility of explosive rupture.

SUMMARY OF THE INVENTION

An apparatus for containing and neutralizing the harmful effects of a hazardous material includes a housing adapted to receive the hazardous material. A filter medium is mounted in the housing between the hazardous material and the atmosphere. A first vent connects the interior of the housing to the filter medium and a second vent connects the filter medium to the atmosphere. The housing is adapted to be hermetically sealed except for the path through the vents and the filter medium.

In one embodiment of the invention, the housing consists of single front and back walls and double side walls to receive filter medium containers. The housing also has a lid which closes to create a hermetic seal with the interior four walls. The inner side walls each have an interior vent which connect into the respective filter medium containers. Exterior vents in the outer side walls connect the filter medium to the atmosphere.

The filter medium is chosen to neutralize the harmful effects of the hazardous material as the material passes through the filters. Thus, any material reaching the atmosphere will be rendered harmless and potentially harmful pressure differentials between the inside of the housing and the atmosphere are obviated. A warning device is mounted in holes provided at the front of the housing and in the top of two chambers containing the filter medium containers. The warning devices incorporate a viewing port through which can be seen a material whose visual characteristics change when exposed to the particular hazardous material contained within the housing. This change provides a warning to the observer that unconfined hazardous material is present within the housing or the filter container chambers and that appropriate precautions should be taken.

BRIEF DESCRIPTION OF THE DRAWINGS

In the drawings which constitute a part of this specification, an exemplary embodiment demonstrating various features of this invention is set forth wherein.

DETAILED DESCRIPTION

Figure 1:
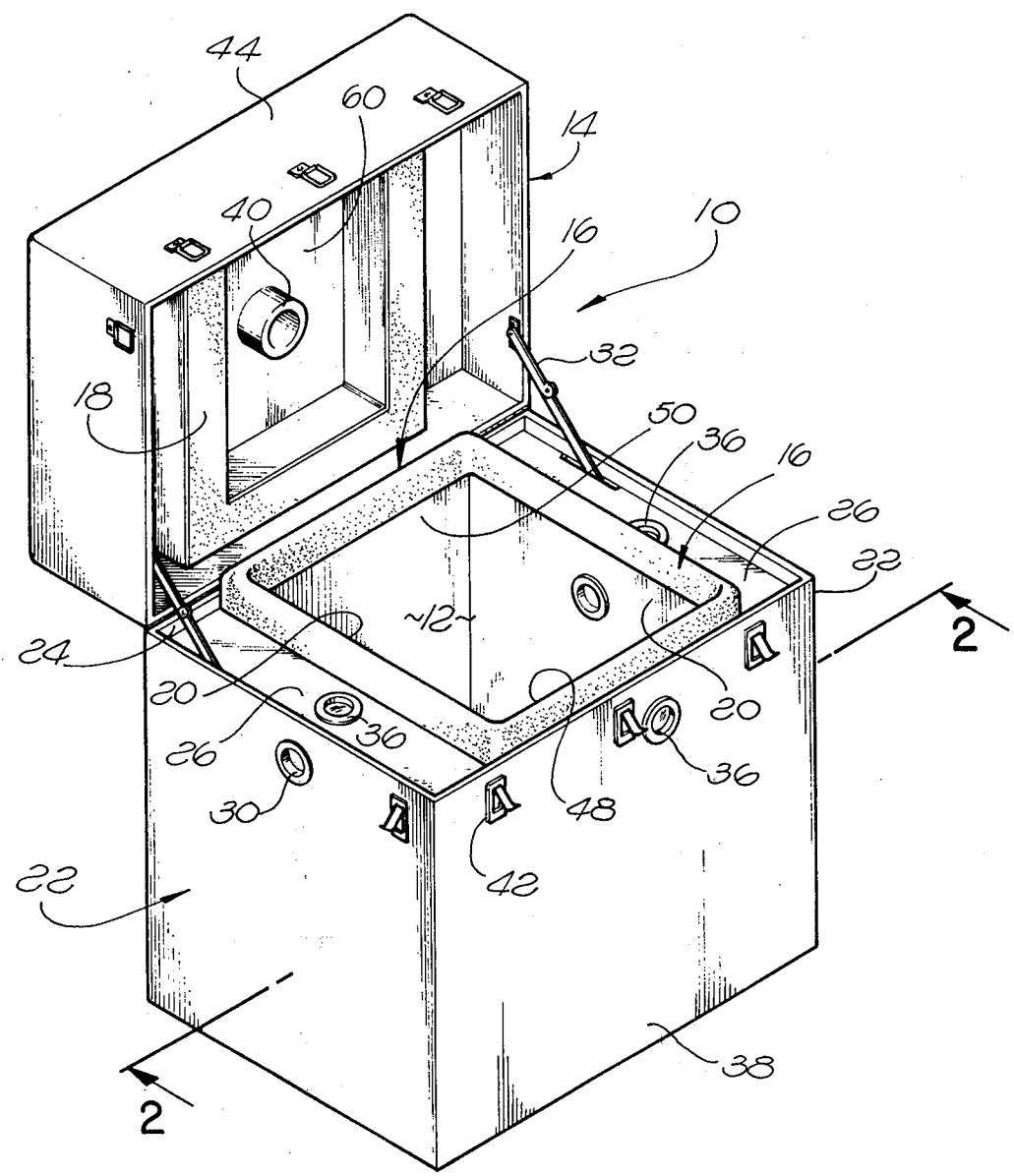
FIG. 1 is a perspective view to the hazard neutralizing container of one embodiment of this invention.

The hazard neutralizing container shown in FIGS. 1–4 includes a rigid housing 10 having a lid 14 and a rim 16 which form a hermetic seal when the lid is closed against the rim. A filter medium container 70 is held between each of the double side walls 20 and 22 of the housing 10. In this embodiment of the invention, the filter medium 72 is activated charcoal packed within the medium containers 70. An interior vent 28 in each interior side wall 20 leads into the filter medium and an exterior vent 30 in each exterior side wall 22 connects the filter medium to the atmosphere.

The particular embodiment described and shown herein is constructed specifically for the transportation of methylbromide, a highly poisonous, gaseous compound often used as a fumigant against rodents. Methylbromide is normally stored in a pressurized spherical, metal container which necessitates the sturdy, rigid construction of the housing 10. It will be understood, however, that various other rigid or flexible housings may be employed depending upon the particular hazardous substance and its container which are to be shipped.

More specifically, FIG. 1 shows a rigid hazard neutralizing container of one embodiment of this invention. The rigid housing 10 consists of a cavity 12 in which the hazardous material is placed for storage or shipment. When the housing lid 14 is closed, a hermetic seal is provided between the cavity rim 16 and a raised portion 18 of the lid 14 which presses against the cavity rim 16. Two double walled sides of the rigid housing 10 each consists of an inner wall 20 and an outer wall 22. A horizontal partition 26 is removably mounted between each inner and outer wall pair 20 and 22 to form chambers 34 which each receive a metal, removable filter medium container 70 mounted between each pair of inner and outer walls. Each filter container 70 is packed with an appropriate filter medium 72.

Each inner side wall 20 has a vent 28 which is connected near the top into the filter medium container 70, as will be explained hereinafter. Each outer side wall 22 has a vent 30 which exhausts from near the top of the filter medium container 70 to the atmosphere. Warning devices 36 are secured into the two filter container chambers 34 and into the front wall 38 of the housing to indicate the presence of unconfined hazardous material within the housing or the filter container chambers.

The lid 14 is rotatably mounted to the housing by a pivot pin (not shown) connecting the lid 14 to the housing rear wall 24 and by two hinge arms 32 secured by rivets or the like to the lid 14 and to the exterior side walls 22. The lid is secured in its closed position by clamps 42 or the like fastening the free end 44 of the lid to the front wall 38 and to the exterior side walls 22 of the housing. All of the exterior walls of the housing and the lid are composed of reinforced fiberglass.

Upon closing the lid 14 after placing a spherical container of methylbromide within the housing cavity 12, force is exerted against the methylbromide container by a cylindrical rubber pad 40 attached to the lid 14 to prevent the methylbromide container from moving within the cavity 12 during transportation.

Figure 2:
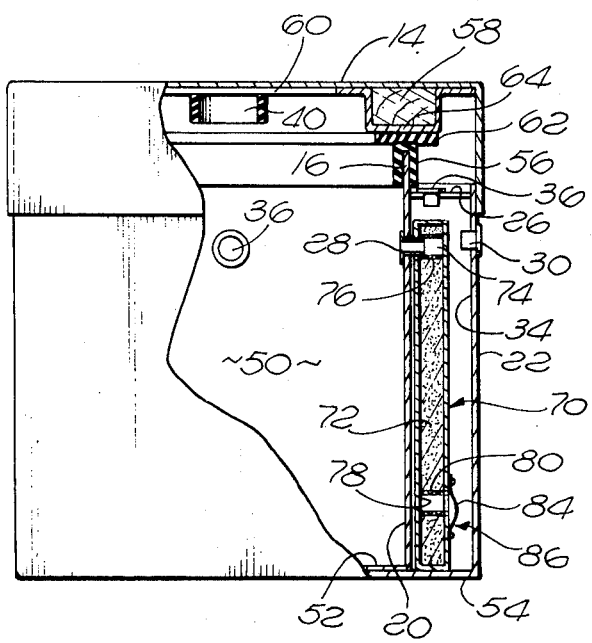
FIG. 2 is a partly cross-sectional elevation view of the interior of the hazard neutralizing container with the lid closed as taken along the line 2—2 of FIG. 1.

FIG. 2 shows more clearly the hermetic seal created between the lid 14 and the cavity rim 16 of the housing 10. Although only one side of the housing has been shown in cross-section, it will be understood that both sides are identical in this embodiment of the invention. The inner housing cavity 12 is bounded on two sides by the previously described fiberglass walls 20. The front, back and bottom of the cavity 12 are formed by fiberglass walls 48, 50 and 52, respectively, integrally molded with the side walls 20 to form a removable insert which rests upon the exterior bottom wall 54 of the housing 10. The raised portion or rim 16 of the insert extending above the horizontal walls 26 is coated with a layer of neoprene rubber 56. The lid 14 has four elongated wooden blocks 58 secured, by glueing or the like, to the underside of the lid directly above the rectangular raised rim 16. An interior U-shaped fiberglass cover 60 is attached to the blocks 58 and to the lid 14 by glueing or the like. Neoprene rubber strips 62 are joined, by glueing or the like, to the raised portions 64 of the interior cover 60 above the rim 16. The thickness of the neoprene rubber coating 56 and strips 62 are chosen to provide a hermetic seal around the perimeter of the cavity 12 due to compression of the neoprene rubber when the lid 14 is closed against the rim 16.

Figure 3:
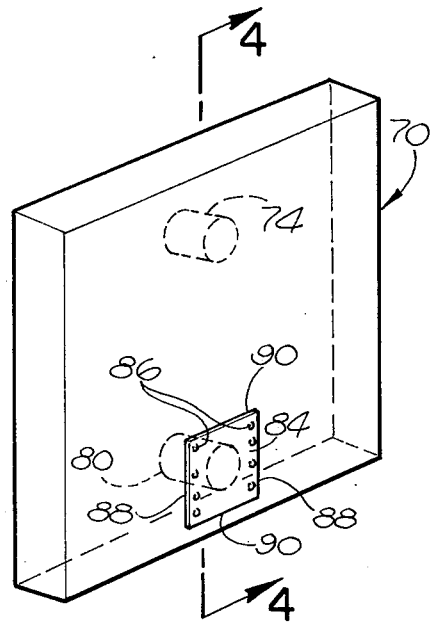
FIG. 3 is a perspective view of one of the filter medium containers employed in the embodiment of this invention shown in FIG. 1.
Figure 4:
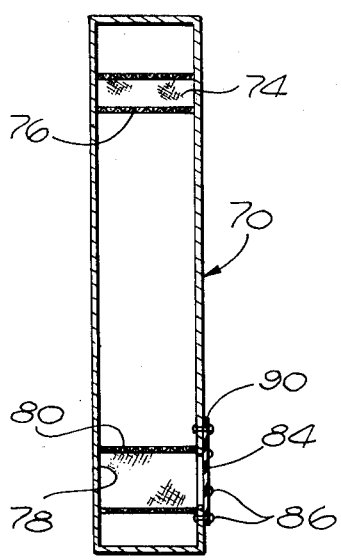
FIG. 4 is a cross-sectional, elevation view taken along the line 4—4 of FIG. 3; and, FIG. 5 is a partly broken away, elevation view of the warning device employed in the embodiment of this invention shown in FIG. 1.

The filter medium containers 70, shown in FIGS. 2-4, are rigid metal containers which are mounted in the chambers 34 between the inner and outer side walls 20 and 22. In this embodiment of the invention, the filter medium 72 packed into the containers 70 is activated charcoal which is an effective neutralizer for methylbromide. A total of about 1 pound of charcoal is employed per ½ pound of methylbromide. The vents 28 in the inner side walls 20 are connected into the filter medium containers through intake vents 74 at the top of the containers. An exhaust vent 78 is provided at the bottom of the filter container 70. The vent 78 leads into the chamber 34 which is provided with a vent 30 in the exterior wall 22 so that neutralized gas may pass to the atmosphere. The filter container vents 74 and 78 are surrounded by screen enclosures 76 and 80 respectively to keep the vent areas free of the filter medium. The intake vent 74 is at the top and exhaust vent 78 is at the bottom of the filter container 70 so that the passage of the gas through the activated charcoal tends to tighten the charcoal packing, thus producing more efficient filtering. A hazard warning device 36 is mounted in each filter container chamber 34 through an aperture in the top wall 26 of each chamber so that the condition of gas in the chambers will be indicated.

One problem with previous filtering techniques is that whenever the atmospheric pressure exceeds the pressure inside the hazard neutralizing container, the air flow reverses direction and air is drawn through the vents and into the housing. This reverse flow has two undesirable effects of first loosening the packed charcoal filter medium thus reducing its effectiveness, and second tending to create channels through the charcoal which again reduces the effectiveness of the charcoal filter medium. In order to eliminate these undesirable effects while at the same time providing a vent to the atmosphere to prevent explosions due to high pressures, a one way valve is provided at the filter container exhaust vent 78. This one way valve consists of a rectangle of neoprene rubber 84 which is secured by rivets 86 on two sides 88 over the exterior port of the exhaust vent 78. When the internal pressure of the housing exceeds that of the atmosphere, the two free sides 90 of the neoprene rubber piece 84 are pushed away from the sides of the container surrounding the vent 78 to allow the neutralized methylbromide to escape. When the housing internal pressure is less than the atmospheric pressure, the neoprene rubber valve 84 collapses against the side of the medium container to prevent air from flowing into the filter medium 72.

Figure 5:
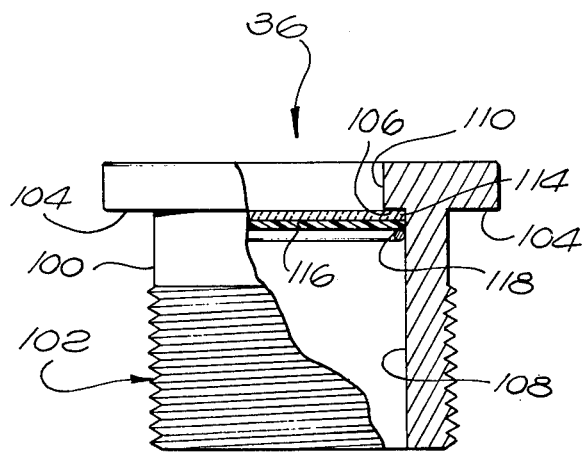

As previously described, warning devices 36 are mounted in the top of each of the filter container chambers 34 and into the front wall 38 of the rigid housing 10. Such a warning device 36, shown in FIG. 5, consists of a hollow aluminum tube 100 which is threaded at one end 102 and has an annular outwardly extending flange 104 and an inwardly directed flange 106 at the opposite end. An air tight viewing port is provided by the bore 108 through the tube 100 and the concentric bore 110 through the flange 106. A clear circular plastic disc 114 slides into the bore 108 and rests against the shoulder 106. A circular disc 116 of chemically treated paper is similarly inserted and positioned against the rear of the plastic disc 114. In this embodiment of the invention, the paper disc 116 is treated with dithizone which changes from green to grey-white upon exposure to methylbromide. The plastic and filter paper discs are held in place against the shoulder 106 and the viewing port is sealed from the inside by a snap ring retainer 118. A nut (not shown) threads onto the threaded portion 102 to securely mount the warning device in position.

In operation, a container of hazardous material is placed within the housing 10 and the housing lid 14 is secured in its closed position by clamps 42. The rubber layer 56 and rubber strips 62 form a hermetic seal at the juncture of the lid 14 and interior housing walls. If the previously confined hazardous material escapes, through rupture of its container or the like, the hazardous material will flow into the housing cavity 12, and activate the warning device 36 in the housing front wall 38. As the escape of hazardous material continues, pressure builds up within the housing. The hazardous material also enters into the filter medium containers 70 through internal vents 28 and 74. As the hazardous material proceeds through the filter medium 72 towards the external vents 28 and 30, the harmful effects are removed by the filter medium. When the pressure within the housing 10 begins to exceed the atmospheric pressure surrounding the housing, air and the neutralized gas will begin to flow through the screens 80 surrounding the vents 78 to push open the one way valves 84 so that the gas escapes into the chambers 34 and to the atmosphere through vents 30. As the neutralized hazardous material exits through the valves 84, it will also flow into contact with the warning devices 36 in the top of the filter container chambers 34.

It will be understood that the described embodiment is exemplary only of the present invention and that other modifications and embodiments in accordance with the invention are contemplated within the spirit of the invention as defined by the following claims.

What is claimed is:

1. An apparatus for containing and neutralizing the harmful effects of a hazardous material, comprising:
   a rigid housing adapted to receive the hazardous material, said housing having a pair of double walls;
   a filter medium container mounted between each pair of double walls;
   a filter medium packed within said medium containers, said filter medium being adapted to neutralize the harmful effects of the hazardous material to be inserted in the housing;
   a vent from the top of each filter medium container to the interior of the housing;
   a vent from the bottom of each filter medium container to the atmosphere;
   means for closing and hermetically sealing said housing except for said vents; and
   a one way valve connected to each of said bottom vents to the atmosphere, said valves being operable only when the pressure within the housing exceeds atmospheric pressure, whereby unconfined hazardous material escapes to the atmosphere only through the filter medium contained within the filter medium containers thereby neutralizing the harmful effects of the hazardous material prior to such material escaping to the atmosphere.

2. An apparatus as defined in claim 1, further comprising warning devices connected to said housing and adjacent said bottom vents, said warning devices containing a substance which will change visual characteristics upon exposure of the substance to the hazardous material.

3. An apparatus for containing and neutralizing the harmful effects of a hazardous material, comprising:
   a housing adapted to receive the hazardous material;
   a filter medium mounted in the housing and interposed between the hazardous material and the atmosphere;
   a filter medium container mounted in said housing for containing said filter medium;
   a first vent positioned at one location on said filter medium for connecting the interior of the housing to the filter medium;
   a second vent positioned at a second location on said filter medium remote from said first vent for connecting the filter medium to the atmosphere, said housing being adapted to be hermetically sealed except for the path through said vents and filter medium, whereby the filter medium is adapted to neutralize the harmful effects of the hazardous material contained within the housing prior to such material escaping to the atmosphere; and
   a one way valve connected to said filter medium container, said valve being operable only when pressure within said filter medium container exceeds the atmospheric pressure.

4. The apparatus as defined in claim 3 and wherein said first vent is positioned on the top of said filter medium and said second vent is positioned at the bottom of said filter medium.

5. An apparatus for containing and neutralizing the harmful effects of a hazardous material, comprising:
   a rigid housing adapted to receive the hazardous material, said housing having a pair of double walls;
   a filter medium container mounted between said pair of double walls;
   a filter medium packed within said medium container, said filter medium being adapted to neutralize the harmful effects of the hazardous material to be inserted in the housing;
   a first vent on one location of said filter medium for communicating with the interior of the housing;
   a second vent at a second remote location on said filter medium for communicating with the atmosphere; and
   means for closing and hermetically sealing said housing except for said vents.

6. An apparatus as defined in claim 5, further comprising warning devices connected to said housing and adjacent said second vent, said warning devices containing a substance which will change visual characteristics upon exposure of the substance to the hazardous material.

7. The apparatus as defined in claim 5 and wherein said filter medium consists essentially of activated charcoal.

8. An apparatus for storing a hazardous material and neutralizing the harmful effects thereof before escaping to the atmosphere in the event the hazardous material escapes into the apparatus, comprising:
   a housing adapted to store the hazardous material, said housing including inner and outer walls;
   a filter medium container removably mounted between said inner and outer walls of said housing;
   a filter medium mounted in said filter medium container;
   a first vent connecting the interior of said housing to said filter medium at a first location on said filter medium;
   a second vent connecting the filter medium to the atmosphere at a second remote location on said filter medium;
   a one way valve connected to the filter medium container, said valve being operable only when pressure within the filter medium container exceeds the atmospheric pressure,
   said housing being adapted to be hermetically sealed except for the path through said vents and filter medium, whereby the housing is adapted to store the hazardous material and the filter medium is adapted to neutralize the harmful effects of the hazardous material contained within the housing in the event the hazardous material escapes into the apparatus.

9. The apparatus as described in claim 8, wherein said filter medium consists essentially of activated charcoal.

* * * * *